US010395069B2

(12) United States Patent
Todasco

(10) Patent No.: US 10,395,069 B2
(45) Date of Patent: *Aug. 27, 2019

(54) RESTRICTING ACCESS TO A DEVICE

(71) Applicant: PAYPAL, INC., San Jose, CA (US)

(72) Inventor: Michael Charles Todasco, Santa Clara, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/037,523

(22) Filed: Jul. 17, 2018

(65) Prior Publication Data
US 2019/0034670 A1    Jan. 31, 2019

Related U.S. Application Data

(63) Continuation of application No. 15/390,032, filed on Dec. 23, 2016, now Pat. No. 10,025,958.

(51) Int. Cl.
*G06F 21/88* (2013.01)
*G06F 21/34* (2013.01)
*H04L 29/06* (2006.01)
*H04W 12/08* (2009.01)
*H04W 12/12* (2009.01)

(52) U.S. Cl.
CPC ............. *G06F 21/88* (2013.01); *G06F 21/34* (2013.01); *H04L 63/105* (2013.01); *H04L 63/107* (2013.01); *H04W 12/08* (2013.01); *H04W 12/12* (2013.01); *G06F 2221/2143* (2013.01)

(58) Field of Classification Search
CPC ....................................................... G06F 21/88
USPC ............................................................. 726/3
See application file for complete search history.

(56) References Cited

U.S. PATENT DOCUMENTS

| | | | | |
|---|---|---|---|---|
| 7,318,170 B2* | 1/2008 | Makela | ............... | G01P 15/0891 713/324 |
| 8,538,401 B2* | 9/2013 | Kim | ...................... | G06F 1/1626 455/418 |
| 8,634,863 B2* | 1/2014 | Hasegawa | ............. | G06F 1/1616 345/158 |
| 2014/0307084 A1* | 10/2014 | Zontrop | .................. | G06T 11/00 348/121 |

* cited by examiner

*Primary Examiner* — Jacob Lipman
(74) *Attorney, Agent, or Firm* — Haynes and Boone, LLP

(57) ABSTRACT

A computer system detects that a mobile device of a user is in a location that exceeds a threshold distance from a second device of the user. Based on at least the detecting, the computer system switches the mobile device to stealth mode, wherein switching the mobile device to stealth mode includes determining an image that visually matches a surface directly below the mobile device, and displaying the image on at least one display of the mobile device. The computer system determines that the second device of the user is located within the threshold distance of the mobile device. Based on the determining, the computer system initiates one or more actions to alert the user as to the location of the mobile device.

20 Claims, 5 Drawing Sheets

RESTRICTING ACCESS TO A DEVICE

CROSS REFERENCED TO RELATED APPLICATIONS

This continuation patent application claims priority to and the benefit of U.S. patent application Ser. No. 15/390,032, filed Dec. 23, 2016, and issued on Jul. 17, 2018 as U.S. Pat. No. 10,025,958, the contents of which are incorporated by reference in its entirety.

TECHNICAL FIELD

The present disclosure relates generally to mobile devices, and more particularly to restricting access to a mobile device.

BACKGROUND

Everyone loses his or her phone at some point in their lives and it can be a real headache. New technologies such as smartphone tracking technologies that utilize a geolocation module in the phone can help ease the burden of locating the phone. However, these mechanisms do not address the potential for theft of a misplaced phone or mobile device. There is a lack of a theft deterrent system for misplaced mobile devices.

DETAILED DESCRIPTION

Embodiments of the present disclosure provide a system, method, and program product. A computer system detects that a mobile device of a user is in a location that exceeds a threshold distance from a second device of the user. Based on the computer system detecting that the mobile device of the user is in a location that exceeds the threshold distance from the second device of the user, the computer system switches the mobile device to stealth mode, wherein switching the mobile device to stealth mode includes determining an image that visually matches a surface directly below the mobile device, and displaying the image on at least one display of the mobile device. The computer system determines that the second device of the user is located within the threshold distance of the mobile device. Based on determining that the second device of the user is located within the threshold distance of the mobile device, the computer system initiates one or more actions to alert the user as to the location of the mobile device.

In the example embodiment, the present disclosure describes a solution a solution to the problem to deterring a person from finding and utilizing a misplaced or lost mobile device or phone. This solution can be useful in keeping personal and private information that is stored on a person's mobile device from being accessed by another person. In the example embodiment, once a mobile device detects that it is "lost", the device goes into a stealth mode, which includes mimicking the environment that the mobile device is located in to prevent other people from seeing the phone and also preventing other people from gaining access to the phone or certain features of the phone. The determination and utilization of stealth mode is described in further detail below.

Embodiments of the present disclosure will now be described in detail with reference to the accompanying Figures.

Figure 1:
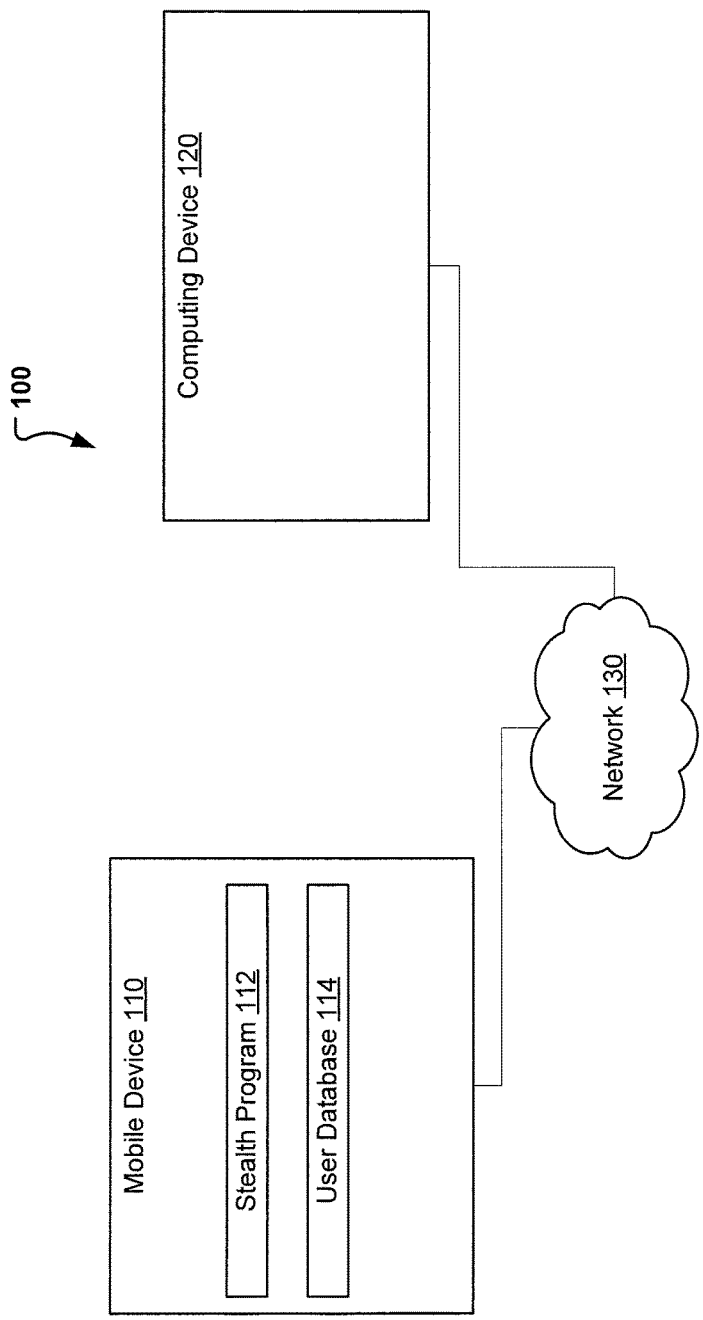
FIG. 1 illustrates a stealth system, in accordance with an embodiment.

FIG. 1 illustrates stealth system 100, in accordance with an embodiment. In an example embodiment, stealth system 100 includes mobile device 110 and computing device 120 interconnected via network 130.

In the example embodiment, network 130 is the Internet, representing a worldwide collection of networks and gateways to support communications between devices connected to the Internet. Network 130 may include, for example, wired, wireless or fiber optic connections. In other embodiments, network 130 may be implemented as an intranet, a local area network (LAN), or a wide area network (WAN). In general, network 130 can be any combination of connections and protocols that will support communications between mobile device 110 and computing device 120.

In the example embodiment, computing device 120 is a computing device capable of receiving and sending data to and from other computing devices, such as mobile device 110, via a network, such as network 130. For example, computing device 120 may be a desktop computer, a laptop computer, a tablet computer, a handheld device, a smartphone, a thin client, or any other electronic device or computing system capable of receiving and sending data to and from other computing devices. Computing device 120 is described in more detail with reference to FIG. 5.

Mobile device 110 includes stealth program 112 and user database 114. In the example embodiment, mobile device 110 is a mobile device such as a smartphone, however in other embodiments, mobile device 110 may be a desktop computer, a laptop computer, a tablet computer, a handheld device, a thin client, or any other electronic device or computing system capable of receiving and sending data to and from other computing devices, such as computing device 120, via network 130. Furthermore, in the example embodiment, mobile device 110 has a display screen on the front of the device and on the back of the device. Furthermore, in the example embodiment, mobile device 110 has a camera on the front of the device and the back of the device. In other embodiments, mobile device 110 has a display screen on one side of the device (front or back) and a camera on one side of the device (front or back). In further embodiments, mobile device 110 may have more than two screens (and cameras), for example, if mobile device 110 is shaped as a cube, each side may have a display screen and a camera. Mobile device 110 is described in more detail with reference to FIG. 5.

User Database 114 includes a description of one or more users. In the example embodiment, the one or more users may include friends and family of the user of mobile device 110. In other embodiments, the one or more users may include acquaintances, and even users not directly known by the user of mobile device 110. Furthermore, the description of the one or more users may include a name, an image/photograph of the user (or multiple images/photographs), a driver's license number, an address, a phone number, a voice recording and additional identification information. In one embodiment, the user of mobile device 110 may input basic identification information such as a name and an address, and stealth program 112 may obtain additional information such as photographs and a driver's license number from external sources (such as a social media, and a DMV database, respectively) via network 130. User database 114 additionally includes information associated with an amount of access each of the one or more users is allotted. In the example, embodiment, the user of mobile device 110 inputs the information pertaining the amount of access each of the one or more users is allotted, however, in other embodiments, the information may be input by another party. Furthermore, the amount of access may be determined based on the category that each of the one or more users belongs to.

In the example embodiment, stealth program 112 is a program capable of determining whether mobile device 110 is more than a threshold distance from a second device of the user (computing device 120) by communicating with computing device 120 via network 130. Furthermore, stealth program 112 is capable of utilizing an accelerometer on mobile device 110 to determine to determine whether the mobile device 110 has been dropped, and further taking pictures of an area (surface) that mobile device 110 lands on. In addition, stealth program 112 is capable of switching on "stealth mode" based on determining that mobile device 110 is more than a threshold distance from computing device 120. In the example embodiment, stealth program 112 is also capable of determining whether mobile device 110 has been picked up by a user, determining who the user is, and providing a specific amount of access based on identification of the user. The operations of stealth program 112 are described in further detail with reference to FIGS. 2 and 3.

Figure 2:
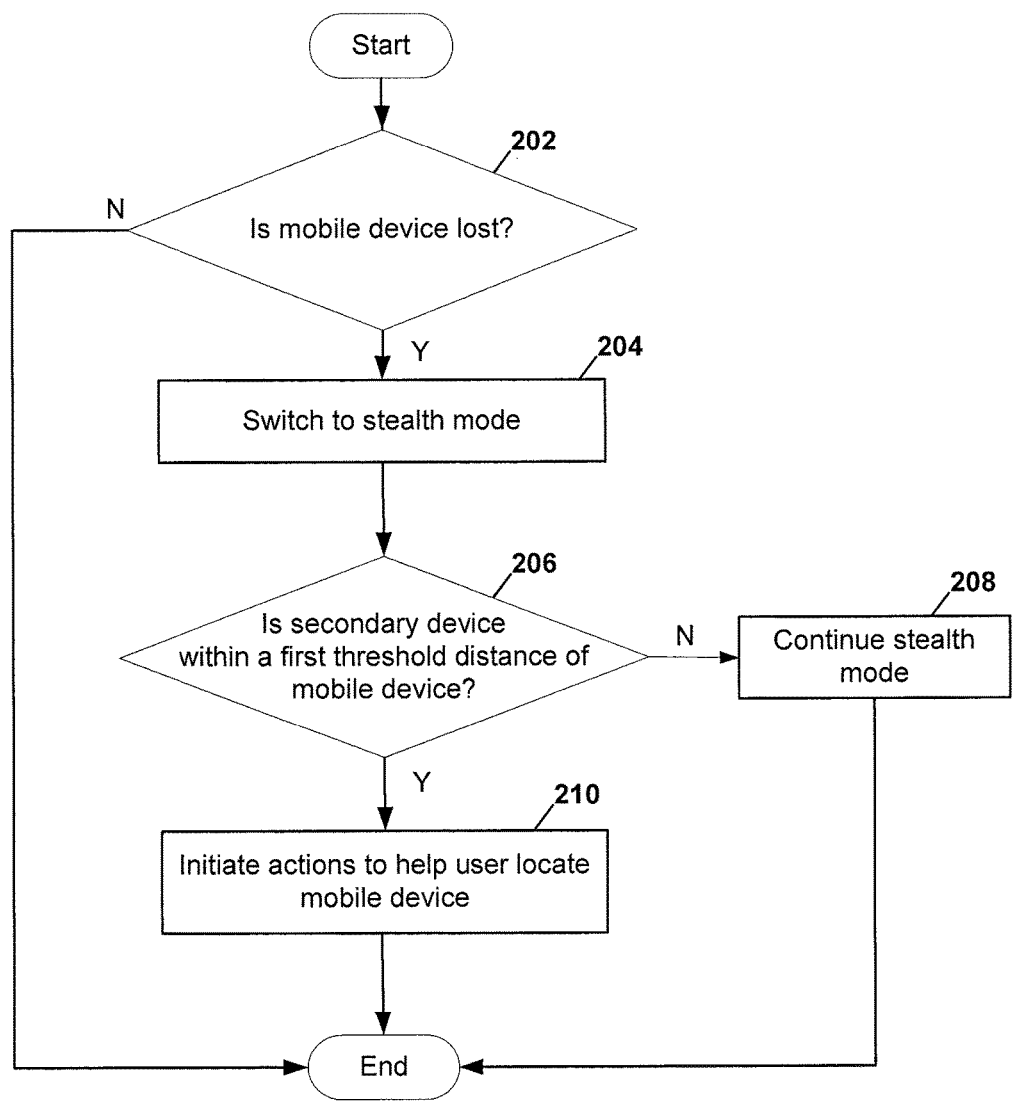
FIG. 2 is a flowchart illustrating the operations of the stealth program of FIG. 1 in switching a mobile device to stealth mode based on determining that the mobile device is lost, in accordance with an embodiment.

FIG. 2 is a flowchart illustrating the operations of stealth program 112 in switching mobile device 110 to stealth mode based on determining that mobile device 110 is lost, in accordance with an embodiment.

In the example embodiment, stealth program 112 determines if mobile device 110 is lost (decision 202). In the example embodiment, stealth program 112 determines if mobile device 110 is within a threshold distance of computing device 120, which is a secondary device of the user of mobile device 110. If stealth program 112 determines that mobile device 110 is in a location that is more than the threshold distance away from computing device 120, stealth program 112 determines that mobile device 110 is lost. If stealth program 112 determines that mobile device 110 is in a location that is less than a threshold distance away from computing device 120, stealth program 112 determines that mobile device 110 is not lost.

In another embodiment, stealth program 112 utilizes an accelerometer present on the mobile device 110 to determine that mobile device 110 is in the process of falling. Furthermore, stealth program 112 utilizes a camera present on mobile device 110 to capture images (and possibly video) of the environment in which mobile device 110 is falling into. For example, as mobile device 110 is falling, stealth program 112 communicates with the accelerometer to determine that mobile device 110 is in the process of falling. Stealth program 112 then utilizes the camera on mobile device 110 to capture images of the environment and surface towards which mobile device 110 is falling towards. Based on stealth program 112 determining that mobile device 110 has fallen, stealth program 112 then determines if mobile device 110 is in a location that is more than the threshold distance away from computing device 120. As stated above, if stealth program 112 determines that mobile device 110 is in a location that is more than the threshold distance away from computing device 120, stealth program 112 determines that mobile device 110 is lost. If stealth program 112 determines that mobile device 110 is in a location that is less than a threshold distance away from computing device 120, stealth program 112 determines that mobile device 110 is not lost.

If stealth program 112 determines that mobile device 110 is not lost (decision 202, "NO" branch), stealth program 112 continues to monitor the distance of mobile device 110 from computing device 120. If stealth program 112 determines that mobile device 110 is lost (decision 202, "YES" branch), stealth program 112 switches mobile device 110 to stealth mode (step 204). In the example embodiment, stealth mode involves stealth program 112 displaying an image on the display of mobile device 110 to match the surface below mobile device 110. Therefore, if a person were to look at mobile device 110 from an aerial view, mobile device 110 would blend in with the surrounding surface. In the example embodiment, stealth program 112 utilizes a global positioning system (GPS) module on mobile device 110 to determine the location of mobile device 110. Stealth program 112 then retrieves satellite images from a map or GPS application via network 130 corresponding to the determined location. In the other embodiment, where stealth program 112 utilized a camera present on mobile device 110 to capture images (and possibly video) of the environment in which mobile device 110 fell into, stealth program may display an image from the captured images on the display of mobile device 110 so that mobile device 110 would blend in with the surrounding surfaces. For example, if mobile device 110 fell onto a carpet, stealth program 112 would capture images of the carpet during the process of falling, and stealth program 112 would display an image matching the carpet pattern on the display of mobile device 110 in order to make mobile device 110 blend into the pattern of the carpet. Furthermore, stealth program 112 may utilize a clock present on mobile device 110 to determine the amount of time that passes from when the image(s) is captured until mobile device 110 makes contact with the surface. Utilizing this information, stealth program 112 utilizes geometric techniques to determine the distance mobile device 110 was from the surface when the image was captured, and resizes the image in order to match the pattern of the surface. Additionally, stealth program 112 utilizes the accelerometer on mobile device 110 to determine an orientation of mobile device 110 in order to determine whether to display the captured image on the front display or the back display. Stealth program 112 then displays the image on one of the front or back display based on the determined orientation. In other embodiments, stealth program 112 may display the image on the front display and the back display.

Stealth program 112 determines whether the secondary device of the user (computing device 120) is within a first threshold distance of mobile device 110 (decision 206). In the example embodiment, the first threshold distance in this step is the same threshold distance utilized in determining whether mobile device 110 was lost. In other embodiments, the first threshold distance in this step may be a different threshold distance from the threshold distance utilized in determining whether mobile device 110 was lost. If stealth program 112 determines that computing device 120 is not within the first threshold distance of mobile device 110 (decision 206, "NO" branch), stealth program 112 continues in stealth mode (step 208).

If stealth program 112 determines that computing device 120 is within the first threshold distance of mobile device 110 (decision 206, "YES" branch), stealth program 112 initiates actions to help the user of mobile device 110 locate mobile device 110 (step 210). In the example embodiment, stealth program 112 may initiate actions including playing music (or other types of auditory stimuli), changing the display to a flashing light, transmitting location information to computing device 120 (such as coordinates), transmitting the captured images to computing device 120. Furthermore, stealth program 112 may further change the actions based on whether computing device 120 is detected as moving closer or further away from mobile device 110. For example, stealth program 112 may auditorily state the distance that computing device 120 is from mobile device 110, and update the distance as computing device 120 moves closer or further away from mobile device 110. In another example, stealth program 112 may only transmit the location information of mobile device 110 (and/or captured images) to computing device 120 until computing device 120 comes within a second threshold distance, at which point, stealth program 112 may initiate auditory and visual actions (such as playing a siren/music/distance and flashing). In this embodiment, the second threshold distance is a smaller distance than the first threshold distance. This embodiment further prevents another person from locating and stealing the phone prior to the user of mobile device 110 locating it.

Figure 3:
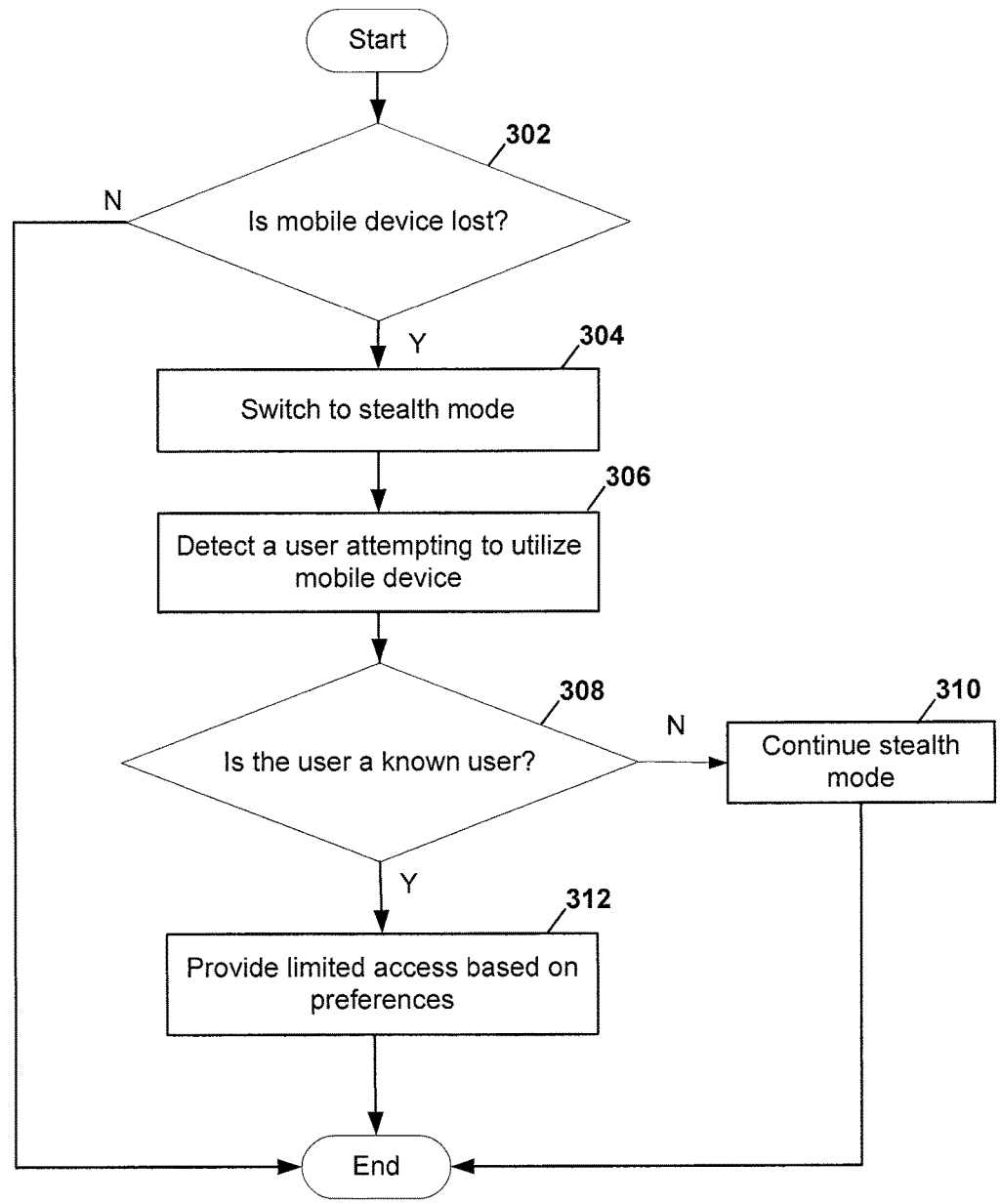
FIG. 3 is a flowchart illustrating the operations of the stealth program of FIG. 1 in determining whether to provide a user with limited access to the mobile device, in accordance with an embodiment.

FIG. 3 is a flowchart illustrating the operations of stealth program 112 in determining whether to provide a user with limited access to the mobile device, in accordance with an embodiment.

In the example embodiment, stealth program 112 determines if mobile device 110 is lost (decision 302). In the example embodiment, stealth program 112 determines if mobile device 110 is within a threshold distance of computing device 120, which is a secondary device of the user of mobile device 110. If stealth program 112 determines that mobile device 110 is in a location that is more than the threshold distance away from computing device 120, stealth program 112 determines that mobile device 110 is lost. If stealth program 112 determines that mobile device 110 is in a location that is less than a threshold distance away from computing device 120, stealth program 112 determines that mobile device 110 is not lost.

In another embodiment, stealth program 112 utilizes an accelerometer present on the mobile device 110 to determine that mobile device 110 is in the process of falling. Furthermore, stealth program 112 utilizes a camera present on mobile device 110 to capture images (and possibly video) of the environment in which mobile device 110 is falling into. For example, as mobile device 110 is falling, stealth program 112 communicates with the accelerometer to determine that mobile device 110 is in the process of falling. Stealth program 112 then utilizes the camera on mobile device 110 to capture images of the environment and surface towards which mobile device 110 is falling towards. Based on stealth program 112 determining that mobile device 110 has fallen, stealth program 112 then determines if mobile device 110 is in a location that is more than the threshold distance away from computing device 120. As stated above, if stealth program 112 determines that mobile device 110 is in a location that is more than the threshold distance away from computing device 120, stealth program 112 determines that mobile device 110 is lost. If stealth program 112 determines that mobile device 110 is in a location that is less than a threshold distance away from computing device 120, stealth program 112 determines that mobile device 110 is not lost.

In a further embodiment, stealth program 112 determines if mobile device 110 is in a designated "safe space". In the example embodiment, the location of "safe spaces", such as coordinate or GPS locations may be input by the user of mobile device 110 and stored on user preferences located on mobile device 110. In this embodiment, stealth program 112 may determine if mobile device 110 is in the process of falling in a similar manner as described above. Stealth program 112 may then compare the location of mobile device 110 to the location information corresponding to the designated "safe spaces". If stealth program 112 determines that the location of mobile device 110 is within a "safe space", stealth program 112 may determine that mobile device 110 is not lost. If stealth program 112 determines that the location of mobile device 110 is not within a "safe space", stealth program 112 may determine that mobile device 110 is lost.

If stealth program 112 determines that mobile device 110 is not lost (decision 302, "NO" branch), stealth program 112 continues to monitor the distance of mobile device 110 from computing device 120. Furthermore, if stealth program 112 determines that mobile device 110 is not lost, stealth program 112 may maintain normal functionality of mobile device 110. If stealth program 112 determines that mobile device 110 is lost (decision 302, "YES" branch), stealth program 112 switches mobile device 110 to stealth mode (step 304). In the example embodiment, stealth mode involves stealth program 112 displaying an image on the display of mobile device 110 to match the surface below mobile device 110. Therefore, if a person were to look at mobile device 110 from an aerial view, mobile device 110 would blend in with the surrounding surface. In the example embodiment, stealth program 112 utilizes a global positioning system (GPS) module on mobile device 110 to determine the location of mobile device 110. Stealth program 112 then retrieves satellite images from a map or GPS application via network 130 corresponding to the determined location. In the other embodiment, where stealth program 112 utilized a camera present on mobile device 110 to capture images (and possibly video) of the environment in which mobile device 110 fell into, stealth program may display an image from the captured images on the display of mobile device 110 so that mobile device 110 would blend in with the surrounding surfaces. For example, if mobile device 110 fell onto a carpet, stealth program 112 would capture images of the carpet during the process of falling, and stealth program 112 would display an image matching the carpet pattern on the display of mobile device 110 in order to make mobile device 110 blend into the pattern of the carpet. Additionally, stealth program 112 utilizes the accelerometer on mobile device 110 to determine an orientation of mobile device 110 in order to determine whether to display the captured image on the front display or the back display. Stealth program 112 then displays the image on one of the front or back display based on the determined orientation. In other embodiments, stealth program 112 may display the image on the front display and the back display.

Stealth program 112 determines that a user is attempting to utilize mobile device 110 (step 306). In the example embodiment, stealth program 112 determines that a user is attempting to utilize mobile device 110 by utilizing the accelerometer on mobile device 110 to determine that mobile device 110 has been picked up. In another embodiment, stealth program 112 may utilize a camera on mobile device 110 to determine that a user is looking at mobile device 110. In this embodiment, stealth program 112 may track the eye movement of the user and utilize geometric techniques to determine that the view direction of the user is towards mobile device 110. In further embodiments, stealth program 112 may utilize haptic sensors or audio sensors present on mobile device 110 to determine that mobile device 110 has been picked up. For example, stealth program 112 may utilize haptic sensors to determine that a user is making contact with mobile device 110 and is therefore attempting to utilize mobile device 110. In another example, stealth program 112 may utilize audio sensors to capture a sound recording. Stealth program 112 may then utilize natural language processing techniques to determine whether the sound recording includes any speech discussing mobile device 110. For example, if stealth program 112 determines that the sound recording states "look a phone", stealth program may determine that a user is attempting to utilize mobile device 110.

Stealth program 112 determines whether the user attempting to utilize mobile device 110 is a known user (decision 308). In the example embodiment, stealth program 112 determines whether the user attempting to utilize mobile device 110 is a known user by utilizing the camera on mobile device 110 to view the user and/or capture an image(s) of the user. In the example embodiment, stealth program 112 views the user and/or captures an image(s) of the user without alerting the user that he/she is being monitored. For example, the images may be captured without the use of flash, without any noise being made, and without anything being shown on the display (or any other visual/audio/haptic cues). Stealth program 112 then utilizes facial recognition technology to cross-reference the image of the user attempting to utilize mobile device 110 with user database 114 to determine if an image of the one or more users in user database 114 corresponds to the image of the user attempting to utilize mobile device 110. In the example embodiment, an image of the one or more users in user database 114 corresponds to the image of the user attempting to utilize mobile device 110 if the faces in the images share a threshold amount of features as determined by the utilized facial recognition techniques. If stealth program 112 determines that an image of the one or more users in user database 114 corresponds to the image of the user attempting to utilize mobile device 110, stealth program determines that the user attempting to utilize mobile device 110 is a known user. Additionally or alternatively, stealth program 112 may utilize a microphone on mobile device 110 to capture a voice recording of the voice of the user attempting to utilize mobile device 110. Stealth program 112 may then utilize voice recognition technology to cross-reference the captured voice recording with user database 114 in order to determine if the user attempting to utilize mobile device 110 corresponds to a user of the one or more users. For example, if stealth program 112 utilizes voice recognition technology and determines that the voice recording matches a voice recording associated with the one or more users in user database 114, stealth program 112 determines that the user attempting to utilize mobile device 110 is a known user. In other embodiments, additional information may be identified and cross-referenced with user database 114 in order to determine if the user attempting to utilize mobile device 110 is a known user, such as a passport number, a driver's license (and/or driver's license number), or an alternative form of identification.

If stealth program 112 determines that the user attempting to utilize mobile device 110 is not a known user (decision 308, "NO" branch), stealth program 112 continues to keep mobile device 110 in stealth mode (step 310). In other embodiments, stealth program 112 may additionally perform a memory wipe of mobile device 110, or alternatively delete files designated as private or confidential by the user of mobile device 110. In further embodiments, stealth program 112 may provide limited access to the unknown user, such as access to make a phone call to the owner of mobile device 110 (the user of mobile device 110) or a contact on a contact list input by the user of mobile device 110 (such as a friend or family member).

If stealth program 112 determines that the user attempting to utilize mobile device 110 is a known user (decision 308, "YES" branch), stealth program 112 provides limited access based on the preferences associated with the known user in user database 114 (step 312). In the example embodiment, as stated above, user database 114 includes information detailing an amount of access each of the one or more users is to be allotted, and therefore, stealth program 112 references user database 114 to identify the amount of access the known user is to be allotted. In other embodiments, as stated above, stealth program 112 may determine the amount of access based on the category that each of the one or more users belongs to. For example, an immediate family member may be allotted a first amount of access, a friend in friend circle 1 may be allotted a second amount of access (that may be less than the first amount of access), and a friend in friend circle 2 may be allotted a third amount of access (that may be less than the second amount of access). In this embodiment, stealth program 112 may determine which category the known user belongs to based on communicating with social networks to determine if the user is designated as a family member, as a friend from friend circle 1, or a friend from friend circle 2. For example, if stealth program 112 determines that the known user is a family member, then stealth program 112 may provide the known user with the first amount of access that may include access to certain applications, and calling/text features, but not include access to additional applications on mobile device 110.

In further embodiments, stealth program 112 may sort users based on an amount of communication that each of the one or more users has had with the user of mobile device 110 over a certain period of time. For example, stealth program 112 may identify the amount of communication between the user of mobile device 110 and a user of the one or more users based on an amount of text messages, an amount of phone calls (and the length of the phone calls), an amount of social media messages, a frequency of text messages/phone calls/ social media messages, and additional electronic communication between the user of mobile device 110 and the respective user of the one or more users. Stealth program 112 then provides the determined amount of access to the known user.

In an additional embodiment, information corresponding to the user of mobile device 110 may also be included in user database 114. In this additional embodiment, stealth program 112 may determine that the user attempting to utilize mobile device 110 is the user of mobile device 110 in the same manner as described above. For example, an image of the user of mobile device 110 may be captured when mobile device 110 is picked up and cross-referenced with user database 114 to determine if the user of mobile device 110 is a known user. In an additional example, a thumbprint of the user of mobile device 110 may be cross-referenced with a thumbprint of the user of mobile device 110 stored in user database 114 in order to determine the identity of the user of mobile device 110. Once stealth program 112 identifies the user of mobile device 110, stealth program 112 may turn off stealth mode and restore full functionality of mobile device 110.

Figure 4:
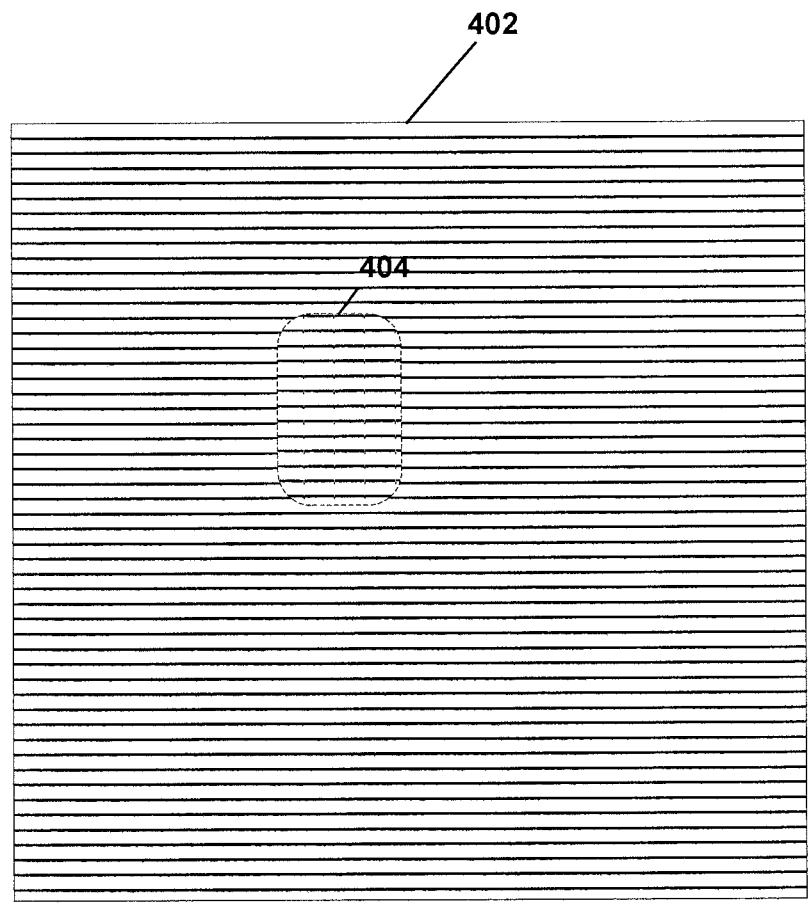
FIG. 4 illustrates the mobile device of FIG. 1 in stealth mode, in accordance with an embodiment.

FIG. 4 illustrates mobile device 110 in stealth mode, in accordance with an embodiment. In the example embodiment, environment 402 represents the environment that mobile device 110 is located in. As stated above, in the example embodiment, if stealth program 112 determines that mobile device 110 is lost, as described above, stealth program switches mobile device 110 in stealth mode. Representation 404 is a depiction of mobile device 110 after stealth program 112 has switched to stealth mode. The image displayed in representation 404 of mobile device 110 matches the pattern of environment 402.

The foregoing description of various embodiments of the present disclosure has been presented for purposes of illustration and description. It is not intended to be exhaustive nor to limit the disclosure to the precise form disclosed. Many modifications and variations are possible. Such modifications and variations that may be apparent to a person skilled in the art of the disclosure are intended to be included within the scope of the disclosure as defined by the accompanying claims.

Figure 5:
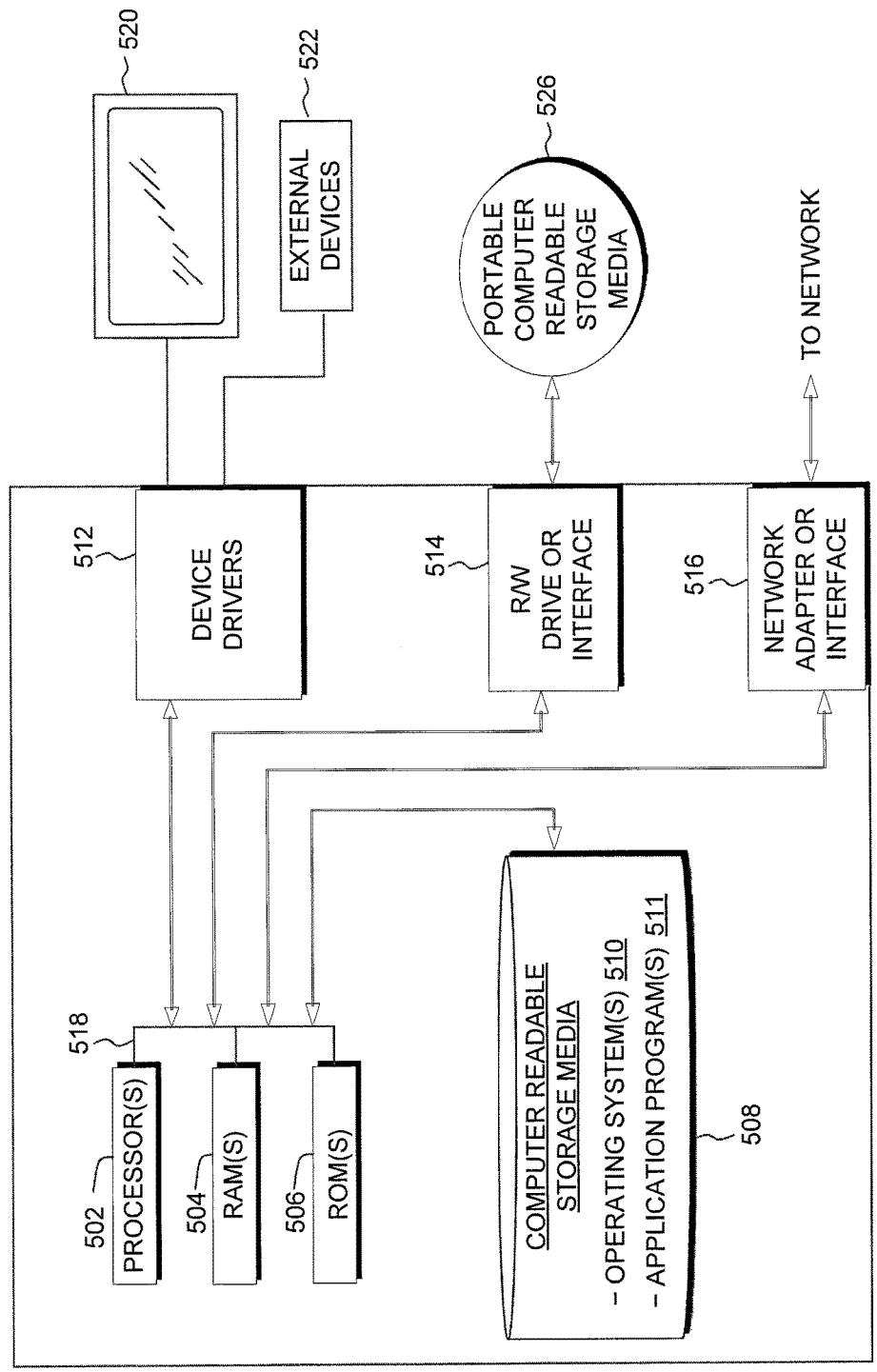
FIG. 5 is a block diagram depicting the hardware components of the stealth system of FIG. 1, in accordance with an embodiment.

FIG. 5 depicts a block diagram of components of computing devices contained in stealth system 100 of FIG. 1, in accordance with an embodiment. It should be appreciated that FIG. 5 provides only an illustration of one implementation and does not imply any limitations with regard to the environments in which different embodiments may be implemented. Many modifications to the depicted environment may be made.

Computing devices may include one or more processors 502, one or more computer-readable RAMs 504, one or more computer-readable ROMs 506, one or more computer readable storage media 508, device drivers 512, read/write drive or interface 514, network adapter or interface 516, all interconnected over a communications fabric 518. Communications fabric 518 may be implemented with any architecture designed for passing data and/or control information between processors (such as microprocessors, communications and network processors, etc.), system memory, peripheral devices, and any other hardware components within a system.

One or more operating systems 510, and one or more application programs 511, for example, stealth program 112, are stored on one or more of the computer readable storage media 508 for execution by one or more of the processors 502 via one or more of the respective RAMs 504 (which typically include cache memory). In the illustrated embodiment, each of the computer readable storage media 508 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing devices may also include a R/W drive or interface 514 to read from and write to one or more portable computer readable storage media 526. Application programs 511 on the computing devices may be stored on one or more of the portable computer readable storage media 526, read via the respective R/W drive or interface 514 and loaded into the respective computer readable storage media 508.

Computing devices may also include a network adapter or interface 516, such as a TCP/IP adapter card or wireless communication adapter (such as a 4G wireless communication adapter using OFDMA technology). Application programs 511 on the computing devices may be downloaded to the computing devices from an external computer or external storage device via a network (for example, the Internet, a local area network or other wide area network or wireless network) and network adapter or interface 516. From the network adapter or interface 516, the programs may be loaded onto computer readable storage media 508. The network may comprise copper wires, optical fibers, wireless transmission, routers, firewalls, switches, gateway computers and/or edge servers.

Computing devices may also include a display screen 520, and external devices 522, which may include, for example a keyboard, a computer mouse and/or touchpad. Device drivers 512 interface to display screen 520 for imaging, to external devices 522, and/or to display screen 520 for pressure sensing of alphanumeric character entry and user selections. The device drivers 512, R/W drive or interface 514 and network adapter or interface 516 may comprise hardware and software (stored on computer readable storage media 508 and/or ROM 506).

The programs described herein are identified based upon the application for which they are implemented in a specific embodiment. However, it should be appreciated that any particular program nomenclature herein is used merely for convenience, and thus the disclosure should not be limited to use solely in any specific application identified and/or implied by such nomenclature.

Based on the foregoing, a computer system, method, and computer program product have been disclosed. However, numerous modifications and substitutions can be made without deviating from the scope of the present disclosure. Therefore, the various embodiments have been disclosed by way of example and not limitation.

Various embodiments of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system comprising:
   one or more computer-readable memories storing program instructions; and
   one or more processors configured to execute the program instructions to cause the system to perform operations comprising:
      determining that a first mobile device, associated with a first user, is in a process of falling or has fallen during a first time period;
      in response to the determining that the first mobile device is in the process of falling or has fallen during the first time period, determining if the first mobile device is located within a safe space; and
      in response to determining that the first mobile device is not located within the safe space, switching the first mobile device to stealth mode, wherein switching the first mobile device to stealth mode includes determining an image that visually matches at least a portion of a surface that is underneath the first mobile device, and displaying the image on at least one display of the first mobile device.

2. The system of claim 1, the operations further comprising:
   in response to determining, at a later time period, that the first mobile device is located within the safe space, switching the first mobile device from stealth mode to a normal operating mode.

3. The system of claim 1, wherein the safe space is a location designated by the first user.

4. The system of claim 1, the operations further comprising:

in response to determining that the first mobile device has been picked up by a second user, deleting one or more files from the first mobile device.

5. The system of claim 4, wherein the determining that the first mobile device has been picked up by the second user includes:
determining that a second mobile device of the first user is outside of a threshold distance of the first mobile device.

6. The system of claim 1, the operations further comprising:
in response to determining that the first mobile device has been picked up by a second user, determining if the second user is a known user; and
in response to determining that the second user is a known user, providing limited access to the first mobile device.

7. The system of claim 6, wherein determining if the second user is a known user includes:
capturing an image of the second user; and
cross-referencing the image with a database containing a plurality of images to identify if the image corresponds to one of the plurality of images.

8. A method comprising:
determining that a first mobile device, associated with a first user, is in a process of falling or has fallen during a first time period;
in response to the determining that the first mobile device is in the process of falling or has fallen during the first time period, determining if the first mobile device is located within a safe space; and
in response to determining that the first mobile device is not located within the safe space, switching the first mobile device to stealth mode, wherein switching the first mobile device to stealth mode includes determining an image that visually matches at least a portion of a surface that is underneath the first mobile device, and displaying the image on at least one display of the first mobile device.

9. The method of claim 8, further comprising:
in response to determining, at a later time period, that the first mobile device is located within the safe space, switching the first mobile device from stealth mode to a normal operating mode.

10. The method of claim 8, wherein the safe space is a location designated by the first user.

11. The method of claim 8, further comprising:
in response to determining that the first mobile device has been picked up by a second user, deleting one or more files from the first mobile device.

12. The method of claim 11, wherein the determining that the first mobile device has been picked up by the second user includes:
determining that a second mobile device of the first user is outside of a threshold distance of the first mobile device.

13. The method of claim 8, further comprising:
in response to determining that the first mobile device has been picked up by a second user, determining if the second user is a known user; and
in response to determining that the second user is a known user, providing limited access to the first mobile device.

14. The method of claim 13, wherein the determining if the second user is a known user includes:
capturing an image of the second user; and
cross-referencing the image with a database containing a plurality of images to identify if the image corresponds to one of the plurality of images.

15. A non-transitory computer readable medium storing program instructions, the program instructions when executed cause a machine to perform operations comprising:
determining that a first mobile device, associated with a first user, is in a process of falling or has fallen during a first time period;
in response to the determining that the first mobile device is in the process of falling or has fallen during the first time period, determining if the first mobile device is located within a safe space; and
in response to determining that the first mobile device is not located within the safe space, switching the first mobile device to stealth mode, wherein switching the first mobile device to stealth mode includes determining an image that visually matches at least a portion of a surface that is underneath the first mobile device, and displaying the image on at least one display of the first mobile device.

16. The non-transitory computer readable medium of claim 15, the operations further comprising:
in response to determining, at a later time period, that the first mobile device is located within the safe space, switching the first mobile device from stealth mode to a normal operating mode.

17. The non-transitory computer readable medium of claim 15, wherein the safe space is a location designated by the first user.

18. The non-transitory computer readable medium of claim 15, the operations further comprising:
in response to determining that the first mobile device has been picked up by a second user, determining if the second user is a known user; and
in response to determining that the second user is a known user, providing limited access to the first mobile device.

19. The non-transitory computer readable medium of claim 18, wherein the determining that the first mobile device has been picked up by the second user includes:
determining that a second mobile device of the first user is outside of a threshold distance of the first mobile device.

20. The non-transitory computer readable medium of claim 19, wherein determining if the second user is a known user includes:
capturing an image of the second user; and
cross-referencing the image with a database containing a plurality of images to identify if the image corresponds to one of the plurality of images.

* * * * *